US009693550B2

(12) United States Patent
Jones et al.

(10) Patent No.: US 9,693,550 B2
(45) Date of Patent: Jul. 4, 2017

(54) GOOSE DECOY

(71) Applicants: Gary Jones, Easton, MD (US); Brian Jones, Easton, MD (US)

(72) Inventors: Gary Jones, Easton, MD (US); Brian Jones, Easton, MD (US)

(*) Notice: Subject to any disclaimer, the term of this patent is extended or adjusted under 35 U.S.C. 154(b) by 130 days.

(21) Appl. No.: 14/341,241

(22) Filed: Jul. 25, 2014

(65) Prior Publication Data
US 2015/0040460 A1 Feb. 12, 2015

Related U.S. Application Data

(60) Provisional application No. 61/859,339, filed on Jul. 29, 2013.

(51) Int. Cl.
A01M 31/06 (2006.01)

(52) U.S. Cl.
CPC .................. *A01M 31/06* (2013.01)

(58) Field of Classification Search
CPC .................................................. A01M 31/06
USPC ........................................ 43/3, 2; 446/388
See application file for complete search history.

(56) References Cited

U.S. PATENT DOCUMENTS

| | | | | |
|---|---|---|---|---|
| 681,306 A * | 8/1901 | Frenkel | ............... | A01M 31/06 43/2 |
| 788,350 A * | 4/1905 | Budwig | ............... | A63H 3/08 446/388 |
| 1,547,967 A * | 7/1925 | Shilhan | ............... | A63H 3/08 446/388 |
| 1,809,635 A * | 6/1931 | Luhrs | ............... | A63H 3/08 446/388 |
| 2,753,658 A * | 7/1956 | Stickley | ............... | A63H 3/06 446/223 |
| 2,974,434 A * | 3/1961 | Gibson | ............... | B42D 15/04 40/124.08 |
| 3,034,255 A * | 5/1962 | Bacon | ............... | A63H 3/14 446/329 |
| 3,228,138 A * | 1/1966 | Lohnes | ............... | B42D 15/04 446/148 |
| 3,461,023 A * | 8/1969 | Pacza | ............... | A47H 23/04 428/12 |
| 3,594,948 A * | 7/1971 | Luchsinger | ............... | A47F 8/02 446/361 |
| 3,707,798 A * | 1/1973 | Tryon | ............... | A01M 31/06 43/3 |
| 4,251,937 A * | 2/1981 | Curley | ............... | A01M 31/06 43/3 |

(Continued)

FOREIGN PATENT DOCUMENTS

| CA | 2275780 A1 * | 12/2000 | ............ A01M 31/06 |
|---|---|---|---|
| CA | 2354489 A1 * | 2/2002 | ............ A01M 31/06 |

(Continued)

*Primary Examiner* — Darren W Ark
(74) *Attorney, Agent, or Firm* — Gianna Julian-Arnold; Saul Ewing LLP

(57) ABSTRACT

A decoy suitable for hunting geese comprising a silhouette portion, side body portions attached to the silhouette portion capable of being folded into a one dimensional appearance or unfolded into a three-dimensional honeycomb appearance resembling the body of a goose from below the neck to the tail, and a stake attached to the bottom of the silhouette portion for insertion into the ground.

6 Claims, 4 Drawing Sheets

(56) References Cited

U.S. PATENT DOCUMENTS

| | | | | | |
|---|---|---|---|---|---|
| 4,318,240 | A | * | 3/1982 | Hillesland | A01M 31/06 43/3 |
| 4,334,643 | A | * | 6/1982 | Farmer | A01M 31/06 43/3 |
| 4,339,887 | A | * | 7/1982 | Streeter | A01M 31/06 43/2 |
| 4,590,699 | A | * | 5/1986 | Nicks | A01M 31/06 43/2 |
| 4,778,431 | A | * | 10/1988 | Dudley | A63H 27/10 446/221 |
| 5,172,506 | A | * | 12/1992 | Tiley | A01M 31/06 43/3 |
| RE34,401 | E | * | 10/1993 | Dudley | A63H 3/06 446/221 |
| 5,259,805 | A | * | 11/1993 | Kieves | A63H 3/06 446/220 |
| 5,279,063 | A | * | 1/1994 | Heiges | A01M 31/06 43/3 |
| 5,293,709 | A | * | 3/1994 | Cripe | A01M 31/06 43/3 |
| 5,967,874 | A | * | 10/1999 | Shaw | G09B 17/00 281/36 |
| 6,095,458 | A | * | 8/2000 | Cripe | A01M 31/06 43/3 |
| 6,115,953 | A | * | 9/2000 | Wise | A01M 31/06 43/3 |
| 6,584,721 | B1 | * | 7/2003 | Reule | A01M 31/06 43/3 |
| 6,874,270 | B2 | * | 4/2005 | Lorenz | A01M 31/06 43/3 |
| 7,337,575 | B2 | * | 3/2008 | Hulley | A01M 31/06 43/3 |
| 7,481,017 | B1 | * | 1/2009 | Bocchi | A01M 31/06 43/3 |
| 7,730,656 | B2 | * | 6/2010 | Hulley | A01M 31/06 43/3 |
| 7,827,728 | B1 | * | 11/2010 | Spafford | A01M 31/06 43/2 |
| 8,082,689 | B2 | * | 12/2011 | Eggleston | A01M 31/06 43/3 |
| 8,191,304 | B2 | * | 6/2012 | Poorman | A01M 31/06 43/2 |
| 2002/0073598 | A1 | * | 6/2002 | Wright | A01M 31/06 43/3 |
| 2007/0157504 | A1 | * | 7/2007 | Nelson | A01M 31/06 43/3 |
| 2007/0266613 | A1 | * | 11/2007 | Nelson | A01M 31/06 43/3 |
| 2013/0283664 | A1 | * | 10/2013 | Kelly | A01M 31/06 43/3 |
| 2014/0082992 | A1 | * | 3/2014 | Mettler | A01M 31/06 43/3 |

FOREIGN PATENT DOCUMENTS

| | | | | |
|---|---|---|---|---|
| FR | 933729 A | * | 4/1948 | A01M 31/06 |
| GB | 492511 A | * | 9/1938 | A01M 31/06 |
| GB | 621277 A | * | 4/1949 | A01M 31/06 |
| WO | WO 2008111966 A1 | * | 9/2008 | A01M 31/06 |

* cited by examiner

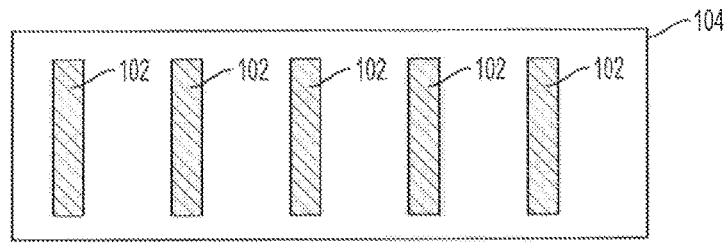
FIG. 1A
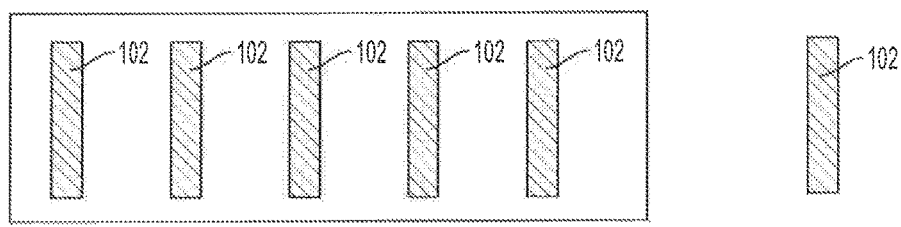
FIG. 1B
FIG. 1C
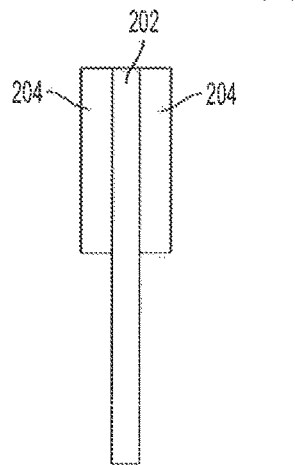
FIG. 2A
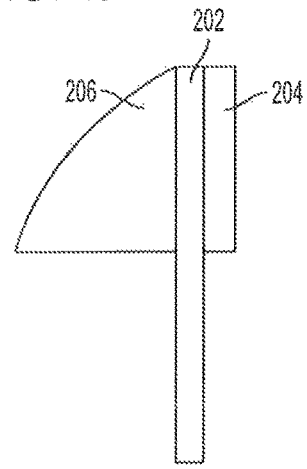
FIG. 2B
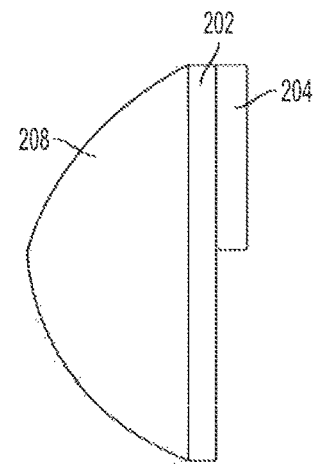
FIG. 2C
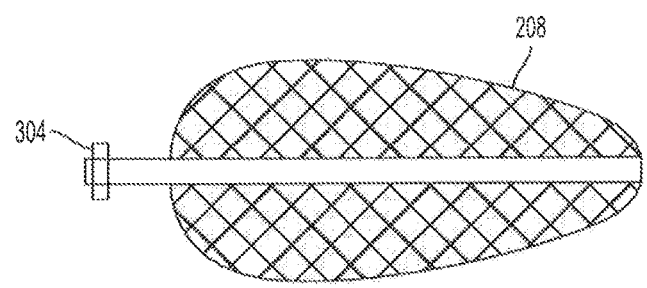
FIG. 3

GOOSE DECOY

CROSS-REFERENCE TO RELATED APPLICATION

This application claims priority to U.S. Provisional Patent Application Ser. No. 61/859,339, filed Jul. 29, 2013. The entire content of this application is hereby incorporated by reference herein.

BACKGROUND OF THE INVENTION

The present invention relates to an animal decoy. While the invention is subject to a wide range of applications, it is especially related to a goose decoy suited for use during hunting.

Goose decoys have been used for centuries. The concept underlying the use of decoys is to artificially represent or "mimic" live geese. The decoys are arranged in a relatively large group (2-8 dozen) making them look as if "live" geese have landed in a field in order to feed.

The effective strategy for using decoys is based on the premise that geese that are flying in the area see the large collection of artificial geese (decoys) on the field. This conveys to the geese that are in flight that the area is safe (since large numbers of other "geese" are already on the ground) and that the field must have an abundance of food available. Consequently, the geese in flight circle and land in close proximity to the "flock" already on the ground. Usually, this coaxing of geese in flight is supplemented by the skilled use of goose calls that, when blown, mimic the sounds geese make on the ground as geese fly nearby. Geese are lured into landing and are then within range of hunters with shotguns. There are two basic types, or designs, of goose decoys available with each manufacturer having slightly different variations of the same concept.

The first type of decoy is the "full body" decoy, which is three dimensional and has the same basic size and shape of a live goose when standing on the ground. The advantage of this decoy is that it resembles as close as possible real geese in a field, which is the idea behind decoys. This type of decoy is manufactured as a mold or plastic extrusion, which is then painted to look like a goose. The finished product is hollow and lightweight, which has an advantage in one sense but also has very real disadvantages.

The major setback to the first type of decoy is its size. It cannot be broken down for ease of carrying or storage. It is not uncommon for a hunter to set out as many as six dozen or more of these decoys. The space required to store this number of decoys presents a problem. A hunter would need to have a significant sized trailer for transport as well as a place to store the trailer. In addition, the act of loading and unloading of the decoys for deployment is time consuming, with the average hunter only being able to unload, carry, and deploy at most four to five decoys at a time. This becomes a hassle when a hunter must deploy seventy-two decoys or more, four at a time with frequent trips back and forth to the trailer.

Another disadvantage of full body decoys is that they are not typically deployed and secured with a stake in the ground but instead are simply placed on the surface. When faced with inclement weather, this poses the problem of the decoys being frequently blown over and someone having to constantly set them upright. Inclement weather (windy, rainy, and snowy, often with frozen ground) is considered the most ideal for goose hunting. However, geese will not land in a field where decoys are blown onto their sides. And, as stated previously, the hunter must make frequent trips out of the blind to set them back on their supporting feet (only to have to repeat the process as often as necessary). When the hunter is out of the blind and walking among the decoys carrying out this task, geese will not land.

The second type of decoy commonly used is the "silhouette" decoy. This is a one dimensional decoy typically made from plywood cut in the shape of the outline of a goose. Although there are now commercially made silhouettes available, they are more likely to be made by the hunter. The advantage of silhouettes is that they are lightweight and easy to carry and deploy. A dozen silhouettes could easily be carried in a small duffle bag by the hunter, carried in groups of ten or twelve into the field, and deployed one by one without making multiple trips. A silhouette's compact size also means that storage represents much less of an issue with no need for a trailer since six dozen of these could be transported in the trunk of a car or in a sport utility vehicle. This greatly expands the range of hunters capable of using this type of decoy since there is no need for a truck or a large trailer for storage of the decoys.

One disadvantage of a silhouette decoy is that it is one dimensional. As geese fly close or directly above this type of decoy the silhouette shape is not seen. This could cause incoming geese to spook and move on. In addition, the entire manufacturing process is very time consuming for the hunter who chooses to build his own decoy. The hunter must obtain and transport the materials and tools required to produce silhouette decoys. Each decoy outline must be drawn on a sheet of ¼" plywood, cut out, sanded, and painted. Finally, a stake is attached for deploying the decoy. The stake is made from galvanized metal stock ¼" thick×1" wide. It is then cut in lengths of 8-10" and attached to each decoy, one at a time, with "pop rivets" or screws. There is also the issue of on-going maintenance since these decoys are made of painted plywood, which is not a maintenance-free material. Paint fades and peels, and plywood weathers and deteriorates, over time. It is not uncommon to need to, at minimum, repaint every decoy before each hunting season.

U.S. Pat. No. 8,191,304 discloses a turkey decoy, for use during hunting, that is designed to be stored and conveyed in a collapsible configuration, but can be erected into a three dimensional fully supported decoy. The body of the turkey is formed of an expandable nylon material and formed of an integrated configuration wherein every component of the body is expandable, as it is unfolded in a circular array from flat to a three-dimensional body part of the turkey. Although useful for turkey hunting, the decoy design of U.S. Pat. No. 8,191,304 would fail if used for goose hunting. For example, the design is too fragile to withstand the conditions of goose hunting as compared to turkey hunting. When hunting turkey, hunters are typically sheltered in a wooded area, which tends to diminish exposure to the extreme weather conditions of goose hunting. The wooded setting is usually without much, if any, wind. In fact, the presence of strong winds is usually a deterrent to turkey hunting. Therefore, while appropriate for its intended game and conditions, the decoy design of U.S. Pat. No. 8,191,304, even with modification, has flaws that would not permit it to withstand the strong relentless freezing wind, rain, and snow conditions often encountered during goose hunting. The support structure and "body" of the prior art decoy would most assuredly fail during conditions of goose hunting, thereby rendering the prior art decoy design inappropriate for goose hunting.

There is a gap in the current choices of decoys available in the market for goose hunting. Thus, there remains a need for a decoy that offers the best advantages of full body decoys and silhouette decoys such that when the decoy is deployed, it is three dimensional and equally effective as full body decoys but can also be easily stored, transported, and deployed as silhouette decoys.

SUMMARY OF THE INVENTION

The object of the invention is to provide a goose decoy that is lightweight, maintenance-free, capable of being stored as a one dimensional decoy, capable of being deployed in large numbers of easily carried decoys, capable of being secured to the ground and capable of being deployed to achieve three dimensional realism. This combination of characteristics provides the waterfowl hunter the advantages of commonly available types of decoys while eliminating the pitfalls of each.

In one representative embodiment, a goose decoy is provided that consists of a silhouette portion with a substantially flat, hard material cut to represent a profile view of a goose, without legs and feet, that is standing, feeding, nesting, or assuming another posture. Two mirror-image side body portions consisting of several of sheets of flexible material are affixed to each other (for example, by glue) using alternating and staggering patterns. Each one of the two mirror-image side body portions are affixed to opposite sides of the silhouette portion to form the left side and right side of the goose decoy, and each one of the two mirror-image side body portions can be alternately folded flat against the silhouette portion to provide a substantially one-dimensional goose decoy and unfolded to provide a three-dimensional honeycomb structure that resembles the full body of a goose with the exception of the head and neck. A stake (rigid or flexible) is attached to the bottom of the silhouette portion for inserting the decoy into the ground for support.

In one aspect, the silhouette portion of the decoy is painted to resemble a goose.

In another aspect, the silhouette portion is constructed using a waterproof, maintenance-free material.

In still another aspect, the flexible material of the two mirror-image side body portions is waterproof, maintenance-free, and paintable.

In another aspect, the two mirror-image side body portions are painted to match the color patterns found on a goose.

One skilled in the art would understand that decoys may be made comprising all or any combination of materials and components described herein.

These and other objects are achieved in the invention.

The present invention overcomes major disadvantages of current decoys such as that disclosed in U.S. Pat. No. 8,191,304. The decoy of the instant invention unfolds as multiple "honeycomb" structures the entire length of the body. In contrast, the "body" of the decoy of U.S. Pat. No. 8,191,304, for example, is constructed in such a way as to unfold as individual fanlike, singular folds of material that span the length of the decoy from head to tail. Therefore, rather than reveal a long head to tail singular fold of material from head to tail, the decoy of the instant invention gives the appearance of numerous folds of as many as 15 or 20 "ends" of "honeycombs" facing outward all around the body of the decoy from head to tail. In other words, when viewing just the "tail" of the turkey decoy of U.S. Pat. No. 8,191,304, that honeycomb appearance would be the entire body of the instantly claimed decoy and not just the ends of the tail.

Multiple "honeycombs" of the instant invention serve to give the decoy a more robust shape than decoys of the prior art. The multiple "honeycombs" also serve to be able to accommodate slits in the ends of the "honeycomb" that will create slight movement that is featherlike when wind passes over the decoy. Consequently, rather than creating the illusion that there are singular individual feathers spanning the length of the decoy from head to tail, the decoy of the present invention abandons a feature of prior art decoys in favor of creating a more necessary sense of bulk and movement. The design of the decoy of the instant invention would likely not work as a turkey decoy because during turkey hunting the turkey are close enough to the decoy and would easily recognize the "honeycomb" appearance rather than the smoother head to tail singular "strands" of feathers. This is the distinction that makes the turkey decoy of the prior art work for its purpose. On the other hand, during goose hunting, hunters are trying to attract geese with decoys placed hundreds of yards, even miles away, thereby avoiding the likelihood that geese will be aware of decoy construction and design.

Other significant differences between prior art decoys and the decoy of the instant invention include the support structure for the instant decoy. The PVC tubing, etc. used for the turkey decoy of U.S. Pat. No. 8,191,304, for example, makes sense for that application because there is much less exposure to wind and weather when turkey hunting in a wooded area that tends to provide shelter. Also, turkeys are usually hunted in the spring. The prior art support structure would not begin to withstand the high winds, rain, freezing rain, and snow of the winter months when geese are hunted. Those conditions coupled with frozen ground in open fields with nothing to mitigate the impact of the wind, would necessitate a much more substantial support structure as accommodated in the design of the instant invention. Further, the use of construction materials such a Tyvek® offers distinct advantages in durability, weight and realism over nylon.

There has thus been outlined, rather broadly, features of the invention in order that the detailed description thereof that follows may be better understood, and in order that the present contribution to the art may be better appreciated. There are, of course, additional features of the invention that will be described further hereinafter. Indeed, it is to be understood that both the foregoing general description and the following detailed description are exemplary and explanatory and are intended to provide further explanation of the invention as claimed.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other decoys for carrying out the several purposes of the present invention. It is important, therefore, that equivalent constructions insofar as they do not depart from the spirit and scope of the present invention, are included in the present invention.

The accompanying drawings are included to provide a further understanding of the invention and are incorporated in and constitute a part of this specification, illustrate several embodiments of the invention, and together with the description serve to explain the principles of the invention.

BRIEF DESCRIPTION OF THE DRAWINGS

FIG. 1A, FIG. 1B, and FIG. 1C each depict a rendering of glue template #1 and #2 note the offset of the glue slots in comparing FIG. 1A with FIG. 1B.

FIG. 2A, FIG. 2B, and FIG. 2C depict a rendering of front view from storage to deployed (not drawn to scale). FIG. 2A depicts storage, FIG. 2B depicts partially deployed, and FIG. 2C depicts fully deployed.

FIG. 3 depicts a rendering of top view (not drawn to scale).

DETAILED DESCRIPTION OF THE INVENTION

Figure 4:
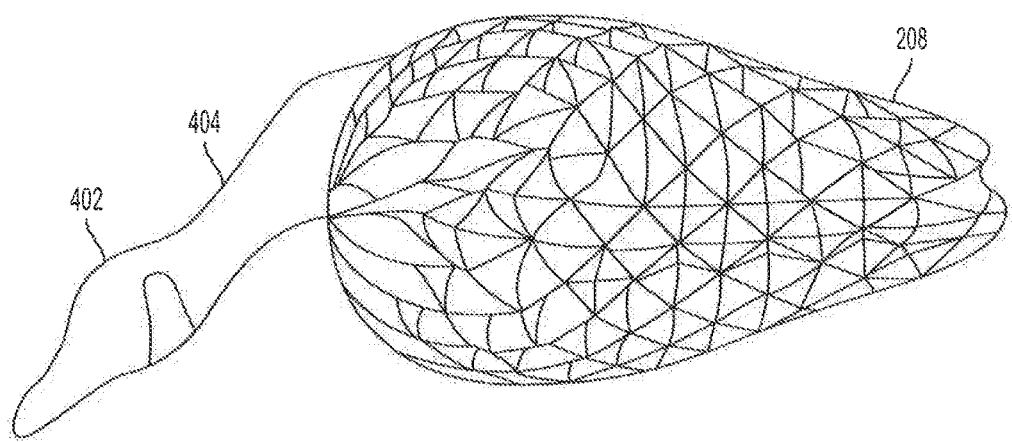
FIG. 4 depicts a profile view "body" deployed.

Provided herein are designs and prototypes of the goose decoy of the instant invention. Reference will now be made in detail to representative embodiments and aspects of the invention, examples of which are illustrated in the accompanying drawings.

Representative prototypes of the decoy of the present invention were made by the following process. Once a mass manufacturing process is established, certain aspects of this process can be altered, but follow the same basic guidelines.

Start with an outline of the profile of a goose standing on the ground in one of several poses (standing, feeding, nesting, etc.). This outline is transferred to a sheet of ¼" plastic or other such waterproof, maintenance-free material. The shape is then cut out and any rough edges sanded. This creates the basic silhouette. The silhouette is then painted in a fashion to resemble that of a goose. It is anticipated that the silhouette can be shaped and painted to represent any variety of goose.

Next, the outline is used to make a template of the body of the goose, everything from the base of the neck back to include the entire "body". This is transferred to another material that is maintenance-free and, although somewhat rigid, capable of being folded. This will be folded in half horizontally to form the "body." Sixty, six-inch by twenty inch sheets of a flexible material that is waterproof, maintenance free, and paintable (such as, but not limited to, Tyvek® home wrap) are cut. These sheets are then painted to match the color patterns found on a goose as they relate to their relationship to location on the body.

Once dry, the sheets are then glued using an alternating pattern. A template for the prototype is shown in FIG. 1. The first sheet 104 is laid out with the twenty inch side horizontal and the six inch side vertical. Glue 102 is applied every three inches in a straight vertical line. The next sheet is laid on top of the first, ensuring that all sides are even and glue is applied every three inches, but staggered to fall directly in the middle of the previous sheet. For example, laying a ruler along the first sheet, glue would be applied to the edge, at the three inch mark, six inch mark, nine inch mark, and so on. For the second sheet, glue would be applied to the one and a half inch mark, four and a half inch mark, seven and a half inch mark, and so on. This alternating pattern will be continued until thirty sheets have been glued. The process is repeated for the remaining thirty sheets. In alternative embodiments, spacing less than every three inches is used to create a more dense honeycomb pattern. For example in one embodiment sheets are applied every 1.5 inches. A goal is to maximize realistic appearance of the decoy while minimizing wind resistance.

When the glue has dried, this stack is placed inside the fold of the material labeled the "body." It is glued on the inside to the top and bottom fold. This process is also repeated for the other side. Once all glue is dried, one assembled body 204 is glued or otherwise attached to the side of the silhouette 202 by the top of the fold only allowing the bottom to unfold and fold freely (FIG. 2). This process is repeated for the other side. This folding and unfolding action is what will give the decoy its three dimensional characteristics. FIG. 2B provides partial unfold body 206 and FIG. 2C provided unfolded body 208. When the assembled body is unfolded, the glued paper making up unfolded body 208 will fan out in a three dimensional honeycomb fashion (FIG. 3).

Figure 5:
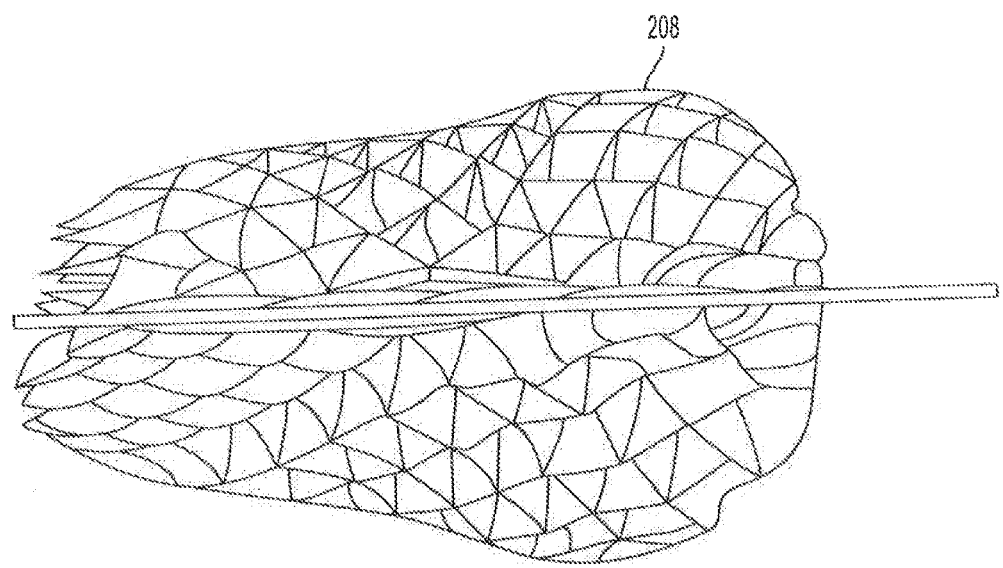
FIG. 5 depicts a top view "body" deployed.
Figure 6:
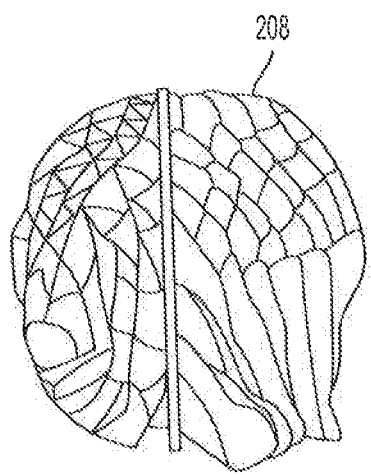
FIG. 6 depicts a rear view "body" deployed.
Figure 7:
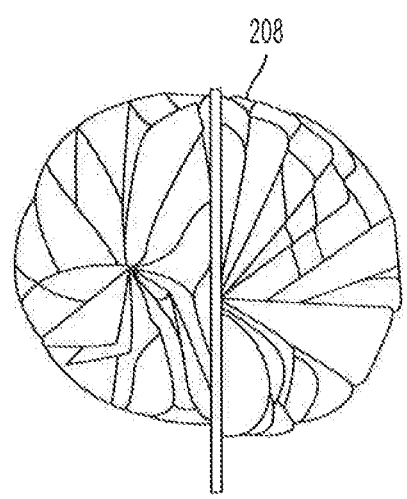
FIG. 7 depicts a front view "body" deployed.
Figure 8:
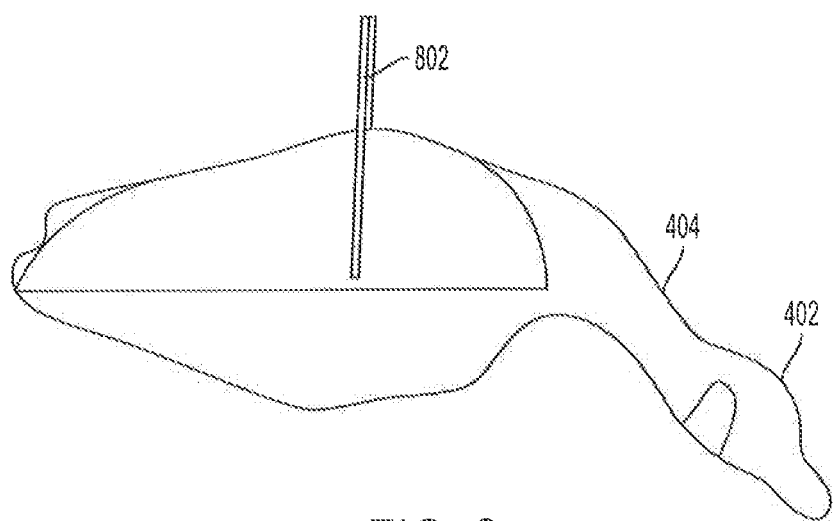
FIG. 8 depicts a profile view in storage.
Figure 9:
FIG. 9 depicts a front view in storage.
Figure 10:
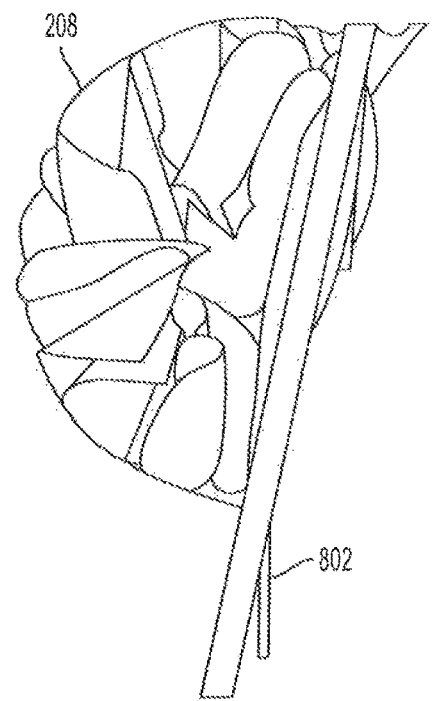
FIG. 10 depicts one side of "body" fully deployed the other side remains up for storage.
Figure 11:
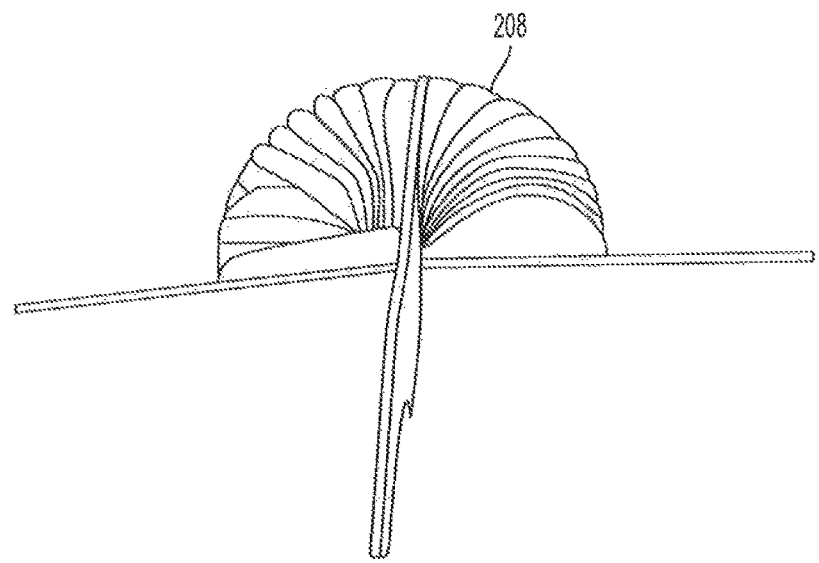
FIG. 11 depicts both sides of "body" being deployed.

When both body sides are unfolded, silhouette 202 now becomes a three dimensional decoy resembling that of a full body decoy with the exception of head 402 and neck 404 (FIGS. 4-7). The body sides can be returned to their folded state and be stored as easily as a silhouette decoy (FIGS. 8-11).

A metal stake 802 (as described earlier) or a strong nylon stake is attached to the bottom of the decoy. The decoy is deployed by pushing it into the ground.

Once a manufacturing process is automated, mass production will incorporate appropriate shortcuts with reduction in time and expense to produce the decoy, leading to attractive pricing.

For example: (1) mass production of all materials, all pre-cut for assembly, and (2) painting can be applied to the body of the sides, head and "honeycomb" materials prior to or following assembly by automated spray paint.

Additional Variations

The "honeycomb" material, such as Tyvek®, can have small slits cut into the outer silhoueaas of each honeycomb on the body of the decoy. As wind blows over the outer surface of the decoy, these slits will create the illusion of movement of feathers, thereby adding even more realism and "motion" to the decoy; another advantage not possible with either "full body" or "silhouette" decoys currently available.

Another manufacturing option would be to create an "add-on" feature to be applied to existing silhouette decoys.

The honeycomb body components could be mass produced so as to be unfolded and attached to the support structure of an existing deployed silhouette decoy. This could be accomplished by building a spring lock mechanism 304 to the honeycomb body. The spring lock mechanism would secure the unfolded honeycomb body to the silhouette; thereby creating an additional market application of the design of the instant invention.

In one embodiment the decoy head is constructed in similar fashion as the body. When unfolded (along with the body) it then provides the appearance of a three dimensional head rather than the "silhouette" type head. In an alternative embodiment, a preformed or molded head is affixed to the body. In this embodiment, the heads can be mass produced and sold separately as replacement heads for either full body molded decoys or the decoys of the present invention.

In alternative embodiments, paint patterns are used that closely resemble the feather colorations of a goose.

The design of decoy of the instant invention is for hunting geese but the use of the decoy design could include hunting both Canada Geese and Snow Geese (and possibly other waterfowl). Construction would essentially be the same. Painting would be much simpler since there would not be the variations in colors required of a Canada Goose. (Snow Geese are all white.) Indeed, many more decoys are deployed when hunting Snow Geese as are typically used when hunting Canada Geese. Evidencing an even greater need for the present invention.

One skilled in the art will recognize that the representative embodiments are applicable to other activities besides hunting.

Each reference referred to within this disclosure is herein incorporated in its respective entirety.

Having now described a few embodiments and aspects of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, because numerous modifications will readily occur to those skilled in the art, it is not desired to limit the invention to the exact construction and operation illustrated and described, and accordingly, all suitable modifications and equivalents may be resorted to, falling within the scope of the invention.

We claim:

1. A goose decoy, comprising:
   (a) a silhouette portion comprising a substantially flat, hard material cut to represent a profile view of a goose, said silhouette portion having flat sides facing laterally in opposite directions, said silhouette portion having a silhouette head region and a silhouette tail region;
   (b) two mirror-image side body portions, each of said body portions having attached thereto a plurality of sheets of flexible material that are glued to each other using alternating and staggering patterns between top and bottom folds of each of said body portions, each of said body portions having a body head region and a body tail region, wherein said flexible material is waterproof, maintenance-free, and paintable; and
   (c) a stake;
   wherein each said top fold of a respective one of said two mirror-image side body portions is fixed to a respective one of said flat sides facing laterally in opposite directions of said silhouette portion to respectively form a left side and a right side of the goose decoy, and wherein each said bottom fold of the respective one of said two mirror-image side body portions being free to move with respect to the respective one of said flat sides facing laterally in opposite directions of said silhouette portion, said silhouette head region matched with said body head regions of said body portions and said silhouette tail region matched with said body tail regions of said body portions;
   wherein each one of said two mirror-image side body portions can be alternately folded flat against said silhouette portion by moving the bottom fold toward the respective top fold to provide a substantially one-dimensional goose decoy and unfolded by moving the bottom fold away from the respective top fold to provide a three-dimensional honeycomb structure that resembles a full body of a goose with the exception of the head and neck, said full body having a length;
   wherein the three-dimensional honeycomb structure encompasses an entirety of the length of said full body;
   wherein when unfolded, the three-dimensional honeycomb structure provides numerous folds having at least 15 edge portions facing outward from the full body;
   wherein said stake is affixed to a bottom of said silhouette portion for insertion into the ground to support the goose decoy;
   wherein said flexible material is not nylon;
   wherein said silhouette portion is painted to resemble a goose; and
   wherein said silhouette portion is a waterproof, maintenance-free material.

2. The goose decoy of claim 1, wherein said two mirror-image side body portions are painted to match the color patterns found on a goose.

3. The goose decoy of claim 1, wherein said silhouette portion does not include a depiction of legs or feet.

4. The goose decoy of claim 1, wherein the edge portions are distributed at locations from said silhouette head region to said silhouette tail region.

5. The goose decoy of claim 1, wherein said flexible material is Tyvek®.

6. The goose decoy of claim 1, further comprising a decoy head, wherein said decoy head is preformed or molded and is attachable to said body portions or to said silhouette portion.

* * * * *